3,401,164
ADDUCTS OF HEXAFLUOROACETONE WITH N-(2-AMINOALKYL)AZIRIDINE
Stanley J. Brois, Matawan, N.J., assignor to Esso Research and Engineering Company, a corporation of Delaware
No Drawing. Filed Jan. 3, 1966, Ser. No. 517,972
2 Claims. (Cl. 260—239)

ABSTRACT OF THE DISCLOSURE

Compounds of the general formula:

$$Y-\underset{\underset{R'}{|}}{\overset{\overset{R}{|}}{C}}-OH$$

where Y represents

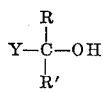 or 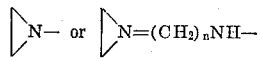

groups; n is an integral number from 2 to 4 inclusive; residue R is haloalkyl; and R' is an organo radical, are pesticidally active compounds, particularly as herbicides and nematocides.

---

The present invention relates to pesticidally active aminohydrins. In general, the invention is concerned with compounds of the general formula:

$$Y-\underset{\underset{R'}{|}}{\overset{\overset{R}{|}}{C}}-OH$$

where Y represents

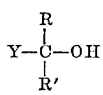 or 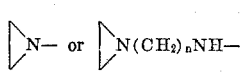

groups. The letter n in the latter case represents integral numbers having values from 2 to 4 inclusive. The residue R is haloalkyl (including perhaloalkyl), preferably chloroalkyl or fluoroalkyl; and R' is an organo radical, preferably selected from the group consisting of hydrogen, alkyl, aryl and R.

In particular, this invention concerns novel compounds of the above general formula, pesticidal compounds of the above general formula, the process for preparing such compounds, pesticidal compositions comprising such compounds, and methods for controlling pests employing such compounds.

Briefly, compounds of the present invention can be prepared by reacting aziridine, i.e., ethylenimine, (Equation 1) or certain N(ω-aminoalkyl)aziridines (Equation 2) with halo ketones or halo aldehydes.

(1) 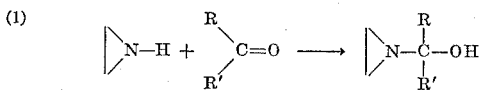

(2) 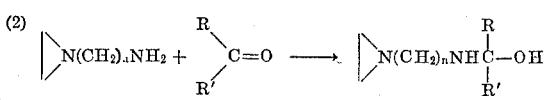

Nonlimiting examples of suitable N(ω-aminoalkyl)aziridine derivatives are N(2-aminoethyl)aziridine, N(3-aminopropyl)-aziridine, and N(4-aminobutyl)aziridine.

Suitable halo ketones or halo aldehydes are those containing about 2 to 6 carbon atoms. The haloalkyl radical may be selected from the group consisting of chloroalkyl, fluoroalkyl, chlorofluoroalkyl, perfluoroalkyl, perchloroalkyl, perfluoroaryl, etc.

Examples of suitable halo ketones or halo aldehydes include but are not limited to hexafluoroacetone, trifluoroacetaldehyde 1,1,1-trifluoroacetone, chloral, chloropentafluoroacetone, trifluoroacetophenone, pentafluorobenzaldehyde, etc. The compounds of the present invention are prepared by reacting essentially stoichiometric amounts of an ethylenimine or an N(ω-aminoalkyl)aziridine with a suitable halo ketone or halo aldehyde.

The reaction can be carried out at temperatures ranging from about −70° C. to about 25° C., preferably −25° C. to about 0° C. Generally the reaction is not carried out at temperatures above about 0° C. Atmospheric pressures are suitable; however, pressurized reaction vessel could also be employed. In general, the reaction appears to be instantaneous. Product precipitation usually occurs immediately after combination of equimolar amounts of aziridine and halocarbonyl compounds. Generally, the reaction mass is stirred, so as to insure complete reaction, preferably for a period of about 15 to 30 minutes. No catalyst is necessary and, in general, a catalyst is not desirable.

The reaction is conducted in the presence of a liquid diluent or solvent. Suitable liquid diluents or solvents are inert. Nonlimiting examples of such diluents or solvents include ether, acetone, halohydrocarbons, etc. A preferred diluent is diethyl ether. In general, about 1 to 2 liters of diluent or solvent is employed per each mole of reactant.

The reaction can be carried out in any suitable reactor in either a batch or continuous process. Preferably, a nitrogen blanket is employed so as to keep a dry inert atmosphere. The process is carried out by mixing the reactants in a suitable vessel maintained at temperatures within the ranges mentioned above. The reaction appears to take place spontaneously and the aminohydrin readily separates from solution. The resulting product is a solid material which can be separated from the reaction mass, for example, by filtration. If desired, the purity of the product may be increased by washing and/or recrystallization. The resulting solid product is readily characterized by infrared and NMR spectroscopy and elemental analysis.

The present invention is further illustrated but not limited by the following examples.

Example 1.—2,2,2-trichloro-1-(N-aziridyl)ethanol

To 0.25 mole of chloral dissolved in 200 ml. of dry ether in a nitrogen purged four-necked flask fitted with stirrer, thermometer, addition funnel and Dewar condenser was slowly added 0.25 mole of ethylenimine in 200 ml. of anhydrous ether. The mixture was kept at 0° C. and continually flushed with dry nitrogen. After complete ethylenimine addition, the aminohydrin separated from solution. The filtered product, obtained in 88% yield, was recrystallized from acetone, M.P. 88–89°.

Analysis.—Calculated for $C_4H_6NOCl_3$: C, 25.20; N, 7.35; Cl, 55.85. Found: C, 25.45; N, 7.35; Cl, 35.90.

Example 2.—2,2,2-trifluoro-1-(N-aziridyl)ethanol

In accord with the procedure described in Example 1, a half mole of ethylenimine was added dropwise to a half mole of trifluoroacetaldehyde hydrate dissolved in 1 liter of ether. The reaction mixture was maintained at 0° C. during the addition. The aminohydrin separated from solution after the ethylenimine addition was completed. The recrystallized product (from acetone), M.P. 99–100° C., was obtained in 54% yield.

*Analysis.*—Calculated for $C_4H_6NOF_3$: C, 34.04; N, 9.92; F, 40.39. Found: C, 34.22; N, 9.83; F, 39.90.

Example 3.—1,1,1,3,3,3-hexafluoro-2-(N-aziridyl)-2-propanol

To an ether solution of 0.5 mole hexafluoroacetone in a four-necked flask equipped with stirrer, thermometer, Dewar condenser and addition funnel was slowly added 0.5 mole of ethylenimine in ether solution. The reaction mixture was kept at −40 to −60° during the course of ethylenimine addition; after complete addition, a white copious solid separated from solution. The mixture was allowed to warm to room temperature and the solid product was filtered off. The aminohydrin was recrystallized from ether acetone, M.P. 148–150°.

*Analysis.*—Calculated for $C_5H_5NOF_6$: C, 28.76; N, 6.69; F, 54.55. Found: C, 29.04; N, 6.54; F, 54.50.

Example 4.—1,1,1,3,3,3-hexafluoro-2[3(N-aziridyl)propylamino]2-propanol

A half mole of hexafluoroacetone was condensed into a reaction flask containing 0.5 mole of N(3-aminopropyl)aziridine in a liter of anhydrous ether at −40 to −60°. After the halo ketone addition was complete, copious white solid precipitated from solution. Recrystallization from ether afforded a 90% aminohydrin, M.P. 85–87° C. The NMR spectrum of the adduct in deuteroacetone showed the expected $A_2B_2$ multiplet (ring protons) at 8.28 and 8.83τ.

*Analysis.*—Calculated for $C_8H_{12}N_2OF_6$: C, 36.10; N, 10.52; F, 42.82. Found: C, 36.88; N, 10.42; F, 42.90.

Example 5.—1,1,1,3,3,3-hexafluoro-2-(N-aziridyl)ethylamino 2-propanol

The addition of 1 mole of hexafluoroacetone to 1 mole of N(2-aminoethyl)aziridine in 1 liter of dry ether at −60° C. gave a quantitative yield of aminohydrin, M.P. 91–93° C. The proton spectrum in methanol-$d_4$ showed diagnostic $A_2B_2$ multiplets (ring hydrogens) at 8.17 and 8.64τ in the expected intensity ratio.

*Analysis.*—Calculated for $C_7H_{10}ON_2F_6$: F, 45.21. Found: F, 45.20.

Example 6

Compounds for this invention were tested for pesticidal activity. The compounds tested include those specifically listed below as well as other compounds falling under the general category of pesticidal aminohydrins as outlined above.

Nematocidal activity of the aminohydrins against Panagrellus, an active saprozoic nematode, was evaluated as follows. In a test tube containing a nematode population of 50–70 per tube was placed 10 ml. of a chemical at the dosage to be tested. The test tube was stoppered and the percent mortality recorded at varying time intervals. The percent mortality at a dosage level of 50 p.p.m. is shown in Table I.

TABLE I.—NEMATOCIDAL ACTIVITY

| Compound | Panagrellus |
|---|---|
| 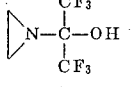 | 95 |
| 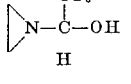 | 100 |
| 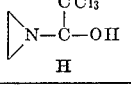 | 100 |

Example 7

The herbicidal action of the compounds of this invention were determined by a seed germination technique on a variety of crops carried out as follows. The compounds at a dosage level of 2,500 p.p.m. are pipetted in 5 cc. quantities onto filter paper contained within plastic petri dishes. Seeds of the selected crops are then placed on the treated disks and observed for germination over a certain period of time. The number of seeds germinating and the extent of root and cotyledon damage is an index of herbicidal potential of the aminohydrins. The herbicidal activity of the compounds of this invention are shown in Table II.

TABLE II.—PRE-EMERGENCE HERBICIDAL ACTIVITY

| Aziridine | Wheat | | Cucumber | | Flax | | Tomato | | Radish | |
|---|---|---|---|---|---|---|---|---|---|---|
| | Percent germ | Pr | Percent germ | Pr | Percent germ | Pr | Percent germ | Pr | Percent germ | Pr |
|  | 0 | 10 | 96 | 8 | 0 | 10 | 78 | 5 | 4 | 9 |
|  | 0 | 10 | 0 | 10 | 0 | 10 | 0 | 10 | 0 | 10 |
|  | 0 | 10 | 100 | 8 | 0 | 10 | 0 | 10 | 34 | 9 |

Percent germ = Percentage of seeds germinating.
Pr = Phytotoxicity Rating wherein 0 equals normal growth, and 10 indicates no growth.

Example 8

In order to evaluate the pre-emergence activity of the aminohydrins of the present invention a flat seeded with six representative crops is sprayed with a formulation containing the compound at a rate equivalent to 20 pounds per acre. The flats are then held in the greenhouse and the response rated after 12–16 days.

In evaluating the post-emergence activity of the aminohydrins the flats are seeded as described above and held until the first true leaves have appeared on all plants. Then they are sprayed in the same fashion as above. The plant responses are rated 12–16 days after treatment.

Table III shows both the pre- and post-emergence activity of the aminohydrins.

TABLE III.—POST AND PRE-EMERGENCE HERBICIDAL ACTIVITY

| Compound | Millet | | Rye | | Sorghum | | Aster | | Buckwheat | | Turnip | |
|---|---|---|---|---|---|---|---|---|---|---|---|---|
| | Post | Pre | Post | Pre | Post | Pre | Post | Pre | Post | Pre | Post | Pre |
| ▷N(CH₂)₃N—C(H)(CF₃)—C(CF₃)—OH | 4 | 5 | 4 | 5 | 3 | 5 | 2 | 3 | 2 | 4 | 2 | 1 |
| ▷N(CH₂)₂N—C(H)(CF₃)—C(CF₃)—OH | 4 | 5 | 4 | 5 | 4 | 5 | 5 | 5 | 4 | 5 | 3 | 3 |

1=No injury, 2=Slow injury, 3=Moderate injury, 4=Severe injury, 5=Killed.

As is apparent from the above, the compounds of the present invention have utility as pesticides. As employed herein, the term pesticide is intended to mean any chemical compound useful in pest control. Thus, the term pesticide includes compounds which function either as an insecticide, a fungicide, a herbicide, a rodenticide, a nematocide or the like. As is apparent from the above examples, a particular compound of the present invention may exhibit one or more different pesticidal activities. The compounds have particular utility as herbicides.

The pesticidally active compounds of this invention can be employed singly or as a mixture with other pesticidal agents. Pesticidal compositions containing the compounds of this invention can be prepared by methods well known to those skilled in the art. Thus, for example, depending upon the physical characteristics of the particular aminohydrin it can be applied as an undiluted spray or may be reduced to an impalpable powder and applied as an undiluted dust, or mixed with a solid carrier such as clay, talc, limestone, bentonite, diatomaceous earth, fillers earth, silica gel, pyrophillite, gypsum and similar materials in a finely comminuted form that are well known in the art. The compounds of this invention may be applied as a spray in a liquid carrier, as a solution in a solvent, or as a suspension in a nonsolvent. When applied as a spray in water, it may be desirable to incorporate wetting agents and/or dispersing agents.

In addition to their primary utility as pesticides, compounds of the present invention may have other utilities such as reactive intermediates for the preparation of other pesticides, pharmaceuticals, or for the preparation of paper treatment chemicals and the like.

It is to be understood that this invention is not limited to the specific examples which have been offered merely as illustrations, since other compounds can be prepared and other modifications made without departing from the spirit of the invention.

What is claimed is:
1. Aminohydrin compounds of the formula:

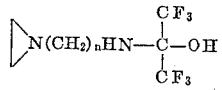

wherein $n$ is an integral number of from 2 to 4 inclusive.

2. A compound of the formula:

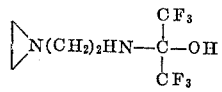

References Cited

Kostyanovoskii, Chemical Abstracts, vol. 56, pp. 1440–1441 (1962).

Kostyanovskii, Doklady Akad. Nauk. S.S.S.R., vol. 139, p. 877–879 (1961).

ALTON D. ROLLINS, *Primary Examiner.*